US012095176B2

(12) United States Patent
Hong et al.

(10) Patent No.: US 12,095,176 B2
(45) Date of Patent: Sep. 17, 2024

(54) ELECTRONIC DEVICE INCLUDING ANTENNA FEEDING UNIT

(71) Applicant: Samsung Electronics Co., Ltd., Suwon-si (KR)

(72) Inventors: Sanghue Hong, Suwon-si (KR); Jaewan Park, Suwon-si (KR); Minsung Koo, Suwon-si (KR); Minsoo Sohn, Suwon-si (KR); Woosung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 17/682,615

(22) Filed: Feb. 28, 2022

(65) Prior Publication Data

US 2022/0302588 A1 Sep. 22, 2022

Related U.S. Application Data

(63) Continuation of application No. PCT/KR2022/002819, filed on Feb. 25, 2022.

(30) Foreign Application Priority Data

Mar. 16, 2021 (KR) ........................ 10-2021-0033978

(51) Int. Cl.
*H01Q 5/335* (2015.01)
*H01Q 1/24* (2006.01)

(52) U.S. Cl.
CPC ............ *H01Q 5/335* (2015.01); *H01Q 1/243* (2013.01)

(58) Field of Classification Search
CPC ........ H01Q 1/243; H01Q 1/32; H01Q 1/3233; H01Q 5/335
See application file for complete search history.

(56) References Cited

U.S. PATENT DOCUMENTS 8,791,864 B2 7/2014 Merz et al.
2013/0154900 A1 6/2013 Tsai et al.
(Continued)

FOREIGN PATENT DOCUMENTS

JP 05-327331 A 12/1993
JP 2005-020074 A 1/2005
(Continued)

OTHER PUBLICATIONS

International Search Report dated Jun. 7, 2022, issued in an international Application No. PCT/KR2022/002819.

*Primary Examiner* — Daniel Munoz
(74) *Attorney, Agent, or Firm* — Jefferson IP Law, LLP

(57) ABSTRACT

An electronic device is provided. The electronic device includes an antenna, a wireless communication module electrically connected to the antenna, a flexible printed circuit board (FPCB) including a first feeding element and a second feeding element which are electrically connected to the wireless communication module, a substrate disposed above the first feeding element and the second feeding element, a first conductive pattern including a first coupling hole and a second conductive pattern including a second coupling hole, which are formed on the upper surface of the substrate, a first coupling fastener configured to penetrate the first coupling hole and the first feeding element and electrically connect the first conductive pattern and the first feeding element, and a second coupling fastener configured to penetrate the second coupling hole and the second feeding element and electrically connect the second conductive pattern and the second feeding element.

18 Claims, 8 Drawing Sheets

(56) References Cited

U.S. PATENT DOCUMENTS

| | | | | |
|---|---|---|---|---|
| 2014/0184456 | A1 | 7/2014 | Lee et al. | |
| 2017/0244149 | A1 | 8/2017 | Kim et al. | |
| 2018/0288203 | A1* | 10/2018 | Jeon | H01Q 5/30 |

FOREIGN PATENT DOCUMENTS

| | | | |
|---|---|---|---|
| JP | 2009-295287 | A2 | 12/2009 |
| KR | 10-2014-0088761 | A | 7/2014 |
| KR | 10-2017-0097396 | A | 8/2017 |
| WO | 99/35709 | A1 | 7/1999 |

* cited by examiner

ELECTRONIC DEVICE INCLUDING ANTENNA FEEDING UNIT

CROSS-REFERENCE TO RELATED APPLICATION(S)

This application is a continuation application, claiming priority under § 365(c), of an International application No. PCT/KR2022/002819, filed on Feb. 25, 2022, which is based on and claims the benefit of a Korean patent application number 10-2021-0033978, filed on Mar. 16, 2021, in the Korean Intellectual Property Office, the disclosure of which is incorporated by reference herein in its entirety.

TECHNICAL FIELD

The disclosure relates to an electronic device including an antenna feeding unit.

BACKGROUND ART

There has been increasing use of electronic devices such as bar-type, foldable-type, rollable-type, sliding-type smartphones or tablet personal computers (PCs), and various functions are provided through electronic devices.

An electronic device may be used for telephone communication and to transmit and receive various kinds of data with another electronic device through wireless communication.

The electronic device may include at least one antenna to perform wireless communication with another electronic device by using a network.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

At least a part of the housing of an electronic device, which forms the exterior thereof, may be made of a conductive metal (for example, metal).

At least a part of the housing, which is made of a conductive material, may be used as an antenna (or antenna radiator) for performing wireless communication. For example, the housing may be separated into at least one segmentation part (for example, slit) and used as multiple antennas.

The electronic device may have an antenna electrically connected to feeding and configured to transmit and/or receive radio signals.

The antenna may have a feeding unit fabricated in a flexible printed circuit board (FPCB) or FPCB type radio frequency (RF) cable (FRC) type, and may be vertically disposed between the PCB and the antenna. If the feeding unit of the antenna is disposed vertically, the electronic component disposition space and the tuning area may become narrower, and the antenna may have difficulty in covering multiple bands.

The feeding unit of the antenna may be coupled to the antenna by directly compressing the same with a screw. When the feeding unit and the antenna are directly coupled with a screw, the feeding unit may be bent by the compressing force from the screw. If the feeding unit is bent, a deviation may occur in the antenna performance.

Aspects of the disclosure are to address at least the above-mentioned problems and/or disadvantages and to provide at least the advantages described below. Accordingly, an aspect of the disclosure is to provide an electronic device wherein a substrate is disposed between at least one coupling means (for example, screw) and at least one feeding unit, and the at least one coupling means and the at least one feeding unit may be coupled via the substrate.

Another aspect of the disclosure is to provide an electronic device wherein at least one conductive pattern is formed on the upper surface of a substrate disposed between at least one coupling means (for example, screw) and at least one feeding unit such that an antenna tuning area can be secured.

Technical problems to be solved by the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes an antenna, a wireless communication module electrically connected to the antenna, a FPCB including a first feeding element and a second feeding element which are electrically connected to the wireless communication module, a substrate disposed above the first feeding element and the second feeding element, a first conductive pattern including a first coupling hole and a second conductive pattern including a second coupling hole, which are formed on the upper surface of the substrate, a first coupling fastener configured to penetrate the first coupling hole and the first feeding element and electrically connect the first conductive pattern and the first feeding element, and a second coupling fastener configured to penetrate the second coupling hole and the second feeding element and electrically connect the second conductive pattern and the second feeding element.

In accordance with another aspect of the disclosure, an electronic device is provided. The electronic device includes an antenna, a wireless communication module electrically connected to the antenna, a FPCB including a first feeding element, a second feeding element, and/or a third feeding element which are electrically connected to the wireless communication module, a substrate disposed above the first feeding element, the second feeding element, and/or the third feeding element, a first conductive pattern including a first coupling hole, a second conductive pattern including a second coupling hole, and/or a third conductive pattern including a third coupling hole, which are formed on the upper surface of the substrate, a first coupling fastener configured to penetrate the first coupling hole and the first feeding element and electrically connect the first conductive pattern and the first feeding element, a second coupling fastener configured to penetrate the second coupling hole and the second feeding element and electrically connect the second conductive pattern and the second feeding element, and a third coupling fastener configured to penetrate the third coupling hole and the third feeding element and electrically connect the third conductive pattern and the third feeding element.

Advantageous Effects of Invention

Various embodiments of the disclosure may provide an electronic device wherein a substrate is disposed between at least one coupling means (for example, screw) and at least one feeding unit, and the at least one coupling means and the at least one feeding unit are coupled via the substrate, thereby preventing the feeding unit from being bent by the compressing force from the coupling means, and reducing a deviation in the radiation performance of the antenna.

Various embodiments of the disclosure may provide an electronic device wherein at least one conductive pattern is formed on the upper surface of a substrate disposed between at least one coupling means (for example, screw) and at least one feeding unit such that an antenna tuning area can be secured.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
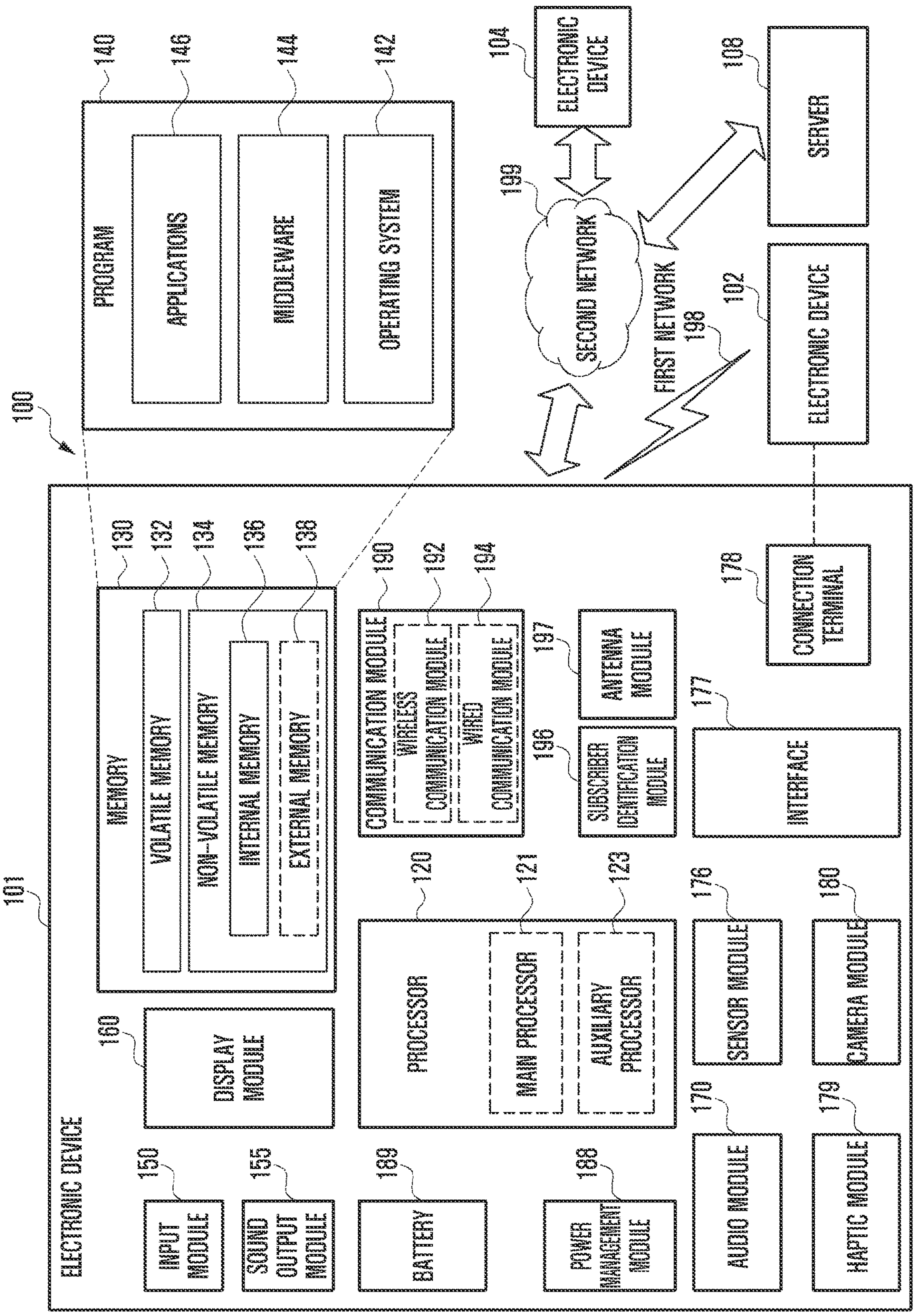
FIG. 1 is a block diagram of an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134 having an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
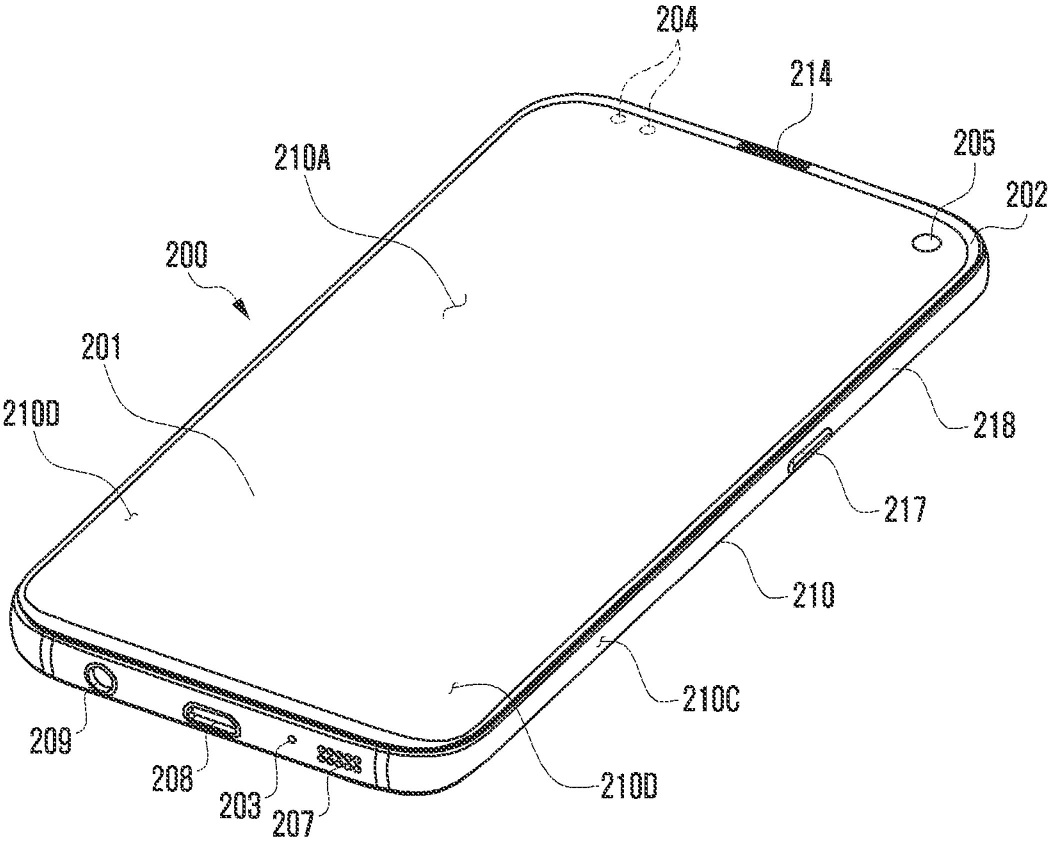
FIG. 2A is a front perspective view of an electronic device according to an embodiment of the disclosure.
Figure 2B:
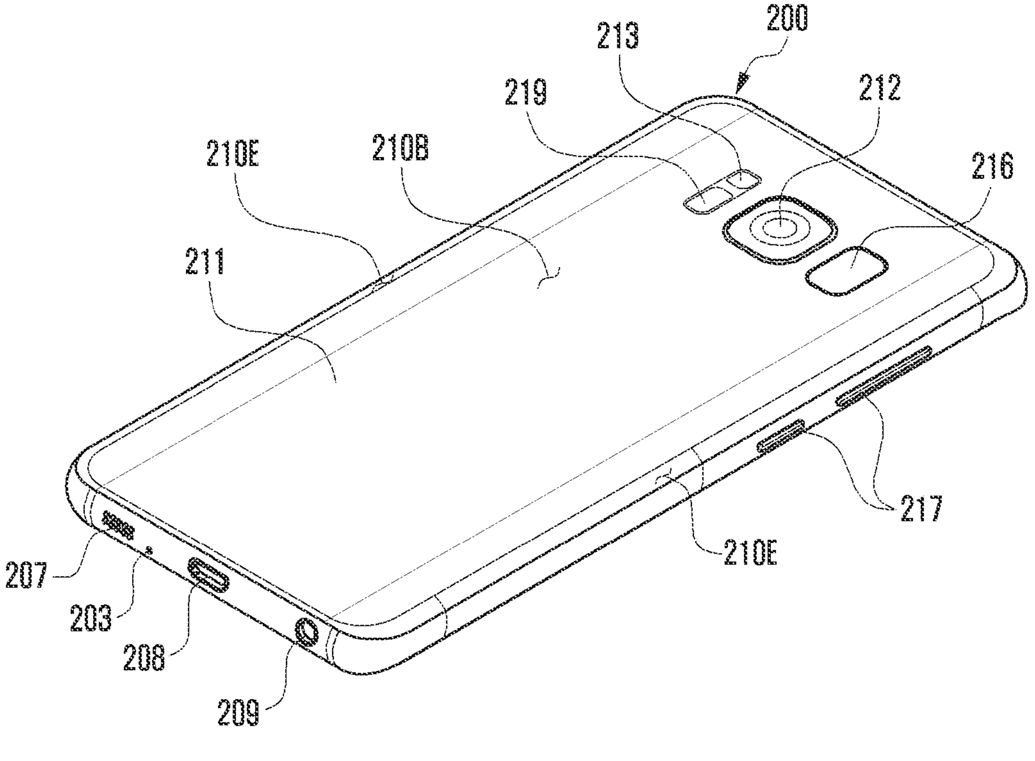
FIG. 2B is a rear perspective view of an electronic device according to an embodiment of the disclosure.

FIG. 2A is a front perspective view of an electronic device according to an embodiment of the disclosure. FIG. 2B is a rear perspective view of an electronic device according to an embodiment of the disclosure.

Referring to FIGS. 2A and 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIGS. 2A and 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to one embodiment, the electronic device 200 may include at least one of a display 201, audio modules 207 and 214, sensor modules 204 and 219, camera modules 205, 212, and 213, key input device 217, indicator (not illustrated), and/or connector holes 208 and 209. In some embodiments, the electronic device 200 may omit at least one (e.g., the key input device 217 or indicator) of the components or may further include other components.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

The audio modules 203, 207, and 214 may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The indicator may be disposed at, for example, the first surface 210A of the housing 210. The indicator may provide, for example, status information of the electronic device 200 in an optical form. In one embodiment, the indicator may provide, for example, a light source interworking with an operation of the camera module 180. The indicator may include, for example, a light emitting diode (LED), an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

Figure 3:
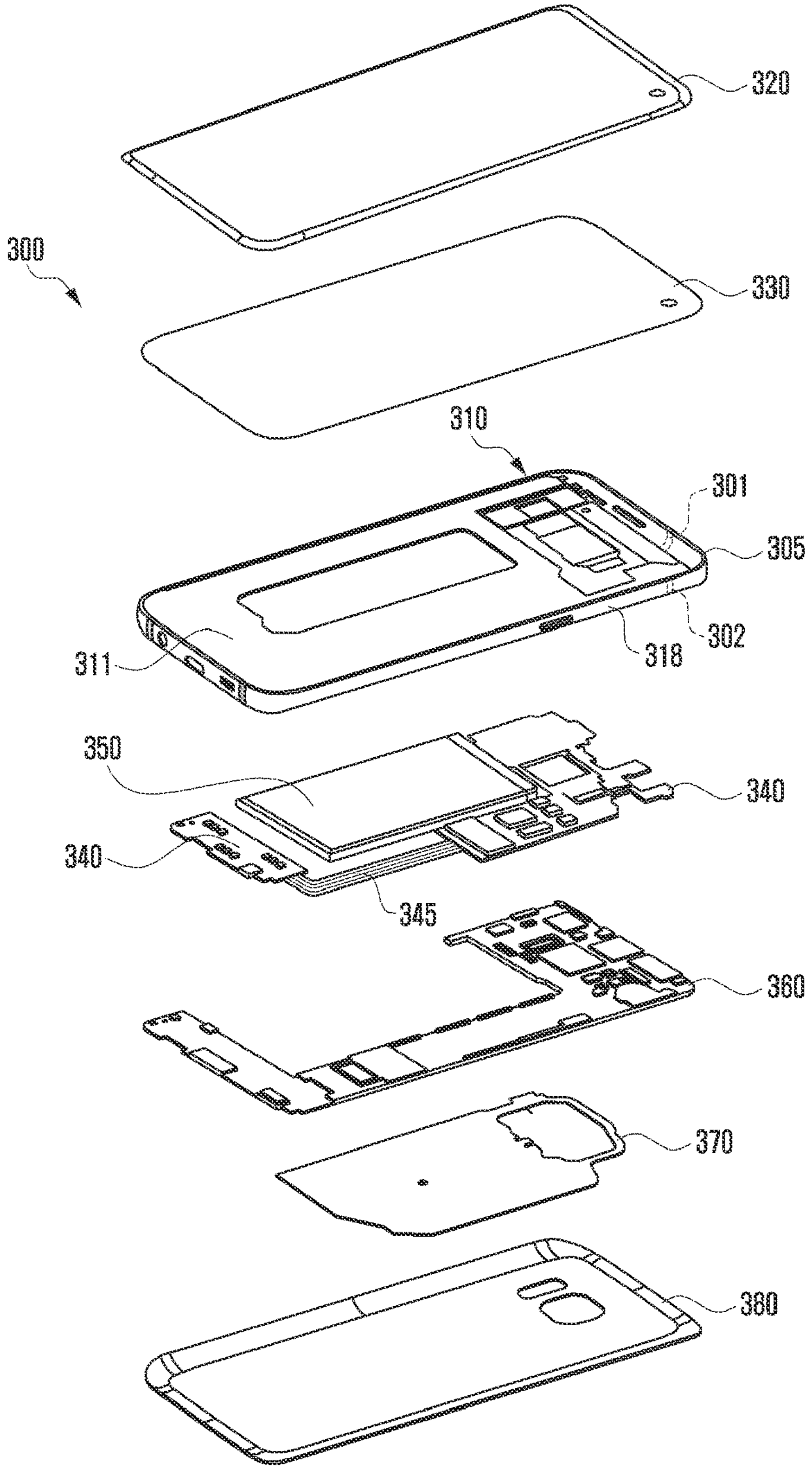
FIG. 3 is an exploded perspective view of an electronic device according to an embodiment of the disclosure.

FIG. 3 is an exploded perspective view of the electronic device according to an embodiment of the disclosure.

Referring to FIG. 3, the electronic device 300 may include a side bezel structure 318, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure 318, or may be formed integrally with the side bezel structure 318. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

According to various embodiments, at least a part of a printed circuit board 340 may be formed in a first direction (e.g., the upper side) and/or a second direction (e.g., the lower side) of an electronic device 300. The printed circuit board 340 may include a structure having multiple printed circuit boards (PCB) stacked thereon. The printed circuit board 340 may include an interposer structure. The printed circuit board 340 may be implemented in the form of a flexible printed circuit board (FPCB) or the form of a rigid printed circuit board (PCB). The printed circuit boards 340 provided in the first direction (e.g., the upper side) and a second direction (e.g., the lower side) may be electrically connected to each other through a signal connection member 345 (e.g., a coaxial cable or an FPCB).

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 318 and/or the first support member 311.

According to an embodiment, a housing 310 may form the exterior of the electronic device 300. For example, the housing 310 may include an antenna 305 (or an antenna radiator) physically separated by a first segmentation part 301 formed on a first portion (e.g., the upper surface) and a second segmentation part 302 formed on a second portion (e.g., the side surface).

According to various embodiments, the housing 310 of the electronic device 300 according to various embodiments of the disclosure may not be limited to the above-mentioned antenna 305, and may further include multiple antennas according to the number of segmentation parts.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 4A:
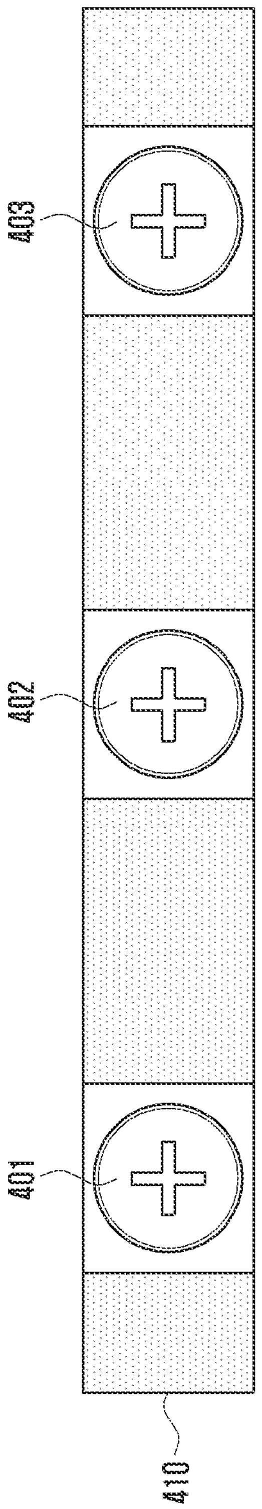
FIGS. 4A and 4B are views illustrating a coupling structure between a coupling means and a feeding unit which are applied to an electronic device according to various embodiments of the disclosure.
Figure 4B:
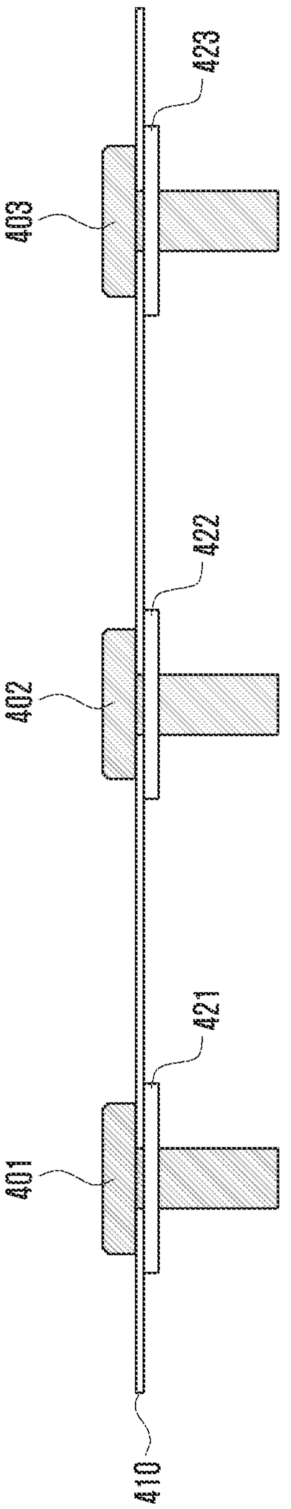

FIGS. 4A and 4B are views illustrating a coupling structure between a coupling means and a feeding unit which are applied to an electronic device according to various embodiments of the disclosure.

According to various embodiments, FIG. 4A is a plan view illustrating a coupling structure of at least one coupling means and at least one feeding unit. FIG. 4B is a side view illustrating a coupling structure of at least one coupling means and at least one feeding unit (at least one feeding element).

Referring to FIGS. 4A and 4B, an electronic device (e.g., the electronic device 101 of FIG. 1, the electronic device 200 of FIG. 2A and FIG. 2B, and/or the electronic device 300 of FIG. 3) may include at least one coupling means (e.g., a first coupling means 401, a second coupling means 402, and a third coupling means 403), a substrate 410, and at least one feeding unit (e.g., a first feeding unit 421, a second feed unit 422, and a third feeding unit 423).

According to an embodiment, at least one of the coupling means, for example, may include the first coupling means 401, the second coupling means 402, and/or the third coupling means 403. The first coupling means 401, the second coupling means 402, and/or the third coupling means 403 each may include a coupling fastener such as a screw and/or a bolt. The first coupling means 401, the second coupling means 402, and/or the third coupling means 403 may be made of a conductive material (e.g., metal).

According to an embodiment, the substrate 410 may include a printed circuit board (e.g., a printed circuit board (PCB), a printed board assembly (PBA), a flexible printed circuit board (FPCB), an FPCB type of RF cable (FRC)) or a rigid plate. The substrate 410 may include a dielectric (e.g., an insulator). The substrate 410 may be disposed between the first coupling means 401 and the first feeding unit 421, between the second coupling means 402 and the second feeding unit 422, and/or between the third coupling means 403 and the third feeding unit 423. The substrate 410 may be disposed above the first feeding unit 421, the second feeding unit 422, and/or the third feeding unit 423.

According to an embodiment, at least one of the feeding unit, for example, may include the first feeding unit 421, the second feeding unit 422, and/or the third feeding unit 423. The first feeding unit 421, the second feeding unit 422, and/or the third feeding unit 423 may be made of a conductive material. The first feeding unit 421, the second feeding unit 422, and/or the third feeding unit 423 may be electrically connected to the wireless communication module 192 and/or the processor 120 of FIG. 1, and may receive or transmit a wireless signal by using an antenna (e.g., the antenna 305 of FIG. 3).

According to various embodiments, the substrate 410 may be disposed between the first coupling means 401 and the first feeding unit 421, between the second coupling means 402 and the second feeding unit 422, and/or between the third coupling means 403 and the third feeding unit 423. The first coupling means 401, the second coupling means 402, and/or the third coupling means 403 may not be directly coupled to the first feeding unit 421, the second feeding unit 422, and/or the third feeding unit 423, respectively, and may be respectively coupled thereto by means of the substrate 410.

According to an embodiment, the first coupling means 401 may be coupled to the first feeding unit 421 by means of the substrate 410. The second coupling means 402 may be coupled to the second feeding unit 422 by means of the substrate 410. The third coupling means 403 may be coupled to the third feeding unit 423 by means of the substrate 410.

According to various embodiments, at least one of the coupling means (e.g., the first coupling means 401, the second coupling means 402, and/or the third coupling means 403) may be coupled to at least one of the feeding unit (e.g., the first feeding unit 421, the second feeding unit 422, and/or the third feeding unit 423), to prevent bending of at least one of the feeding unit due to pressing force by at least one of the coupling means.

Figures 5A, 5B, 5C:
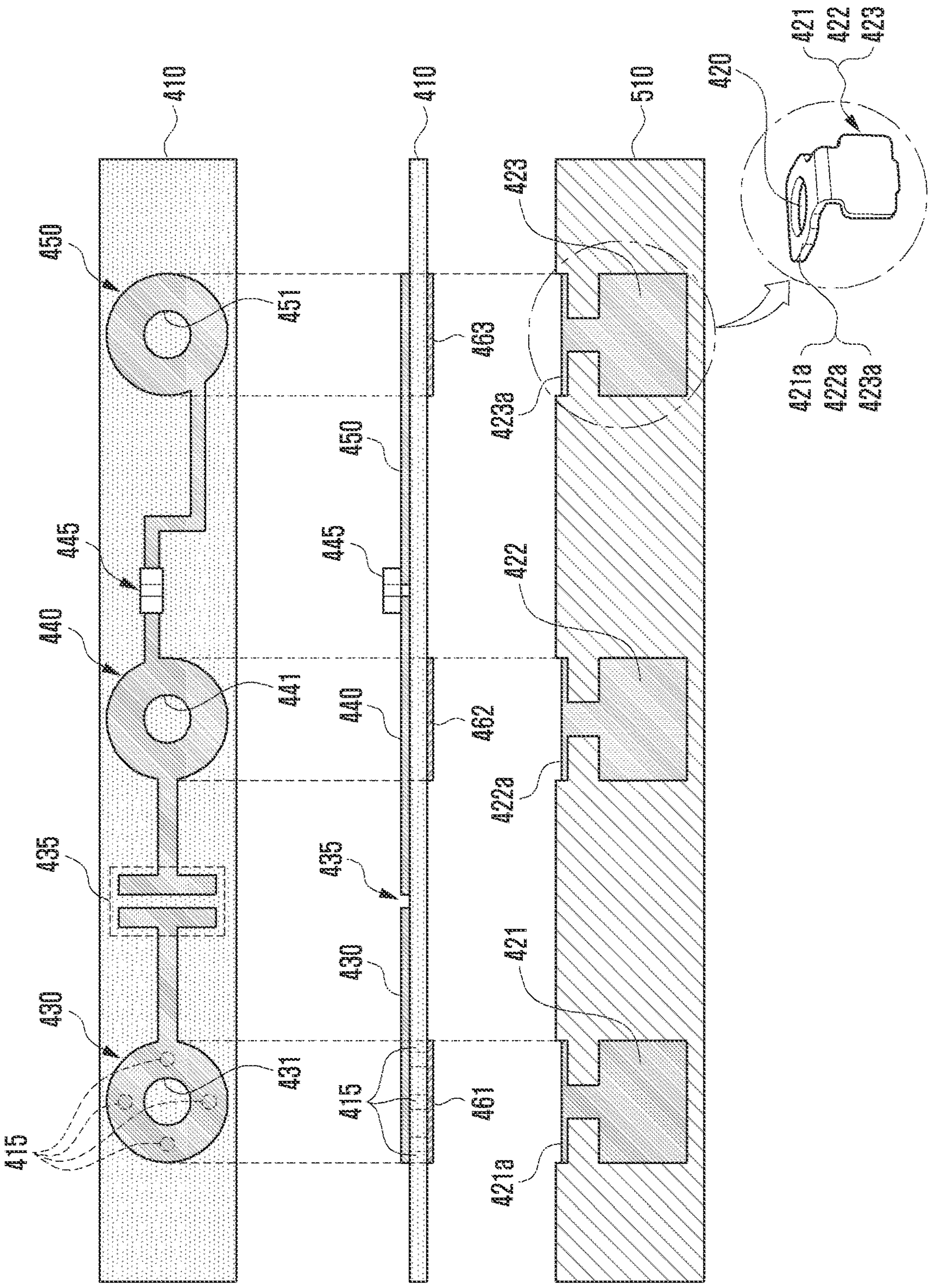
FIGS. 5A, 5B, and 5C are views illustrating configurations of a substrate and an FPCB which are applied to an electronic device according to various embodiments of the disclosure.
Figure 6:
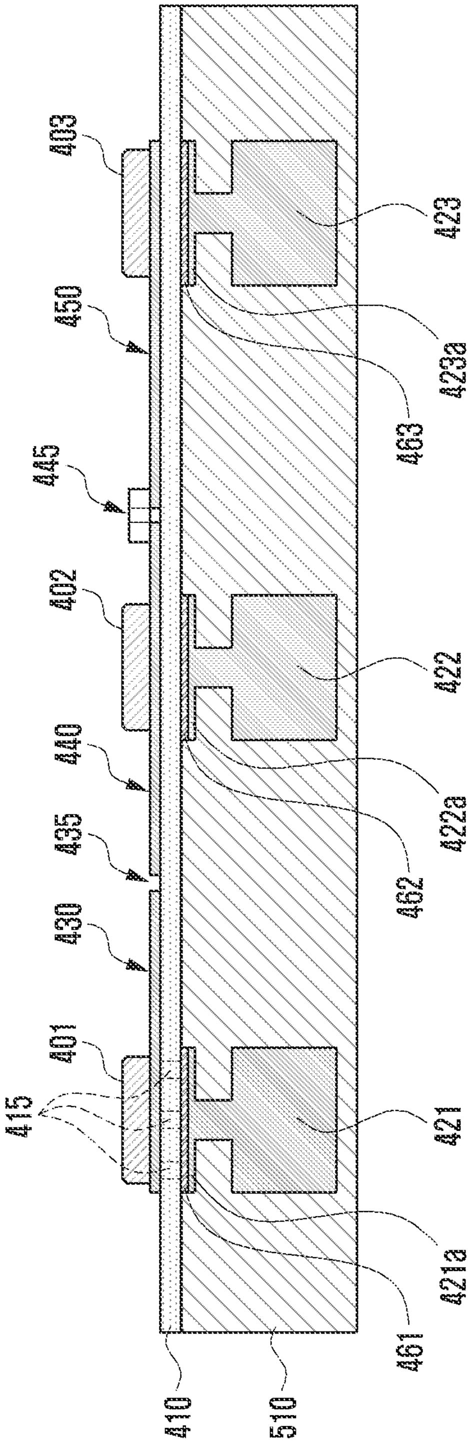
FIG. 6 is a side view illustrating a coupled state of a substrate and an FPCB which are applied to an electronic device according to an embodiment of the disclosure.

FIGS. 5A to 5C are views illustrating configurations of a substrate and an FPCB which are applied to an electronic device according to various embodiments of the disclosure. FIG. 6 is a side view illustrating a coupled state of a substrate and an FPCB which are applied to an electronic device according to an embodiment of the disclosure.

According to various embodiments, FIG. 5A is a view illustrating at least one conductive pattern formed on the upper surface of a substrate. FIG. 5B is a view illustrating at least one conductive pattern formed on the upper surface of a substrate and at least one conductive pad disposed on the lower surface of a substrate. FIG. 5C is a view illustrating configurations of an FPCB and a feeding unit according to various embodiments of the disclosure.

Referring to FIGS. 5A and 5B, a substrate 410 according to various embodiments of the disclosure may include a first conductive pattern 430, a second conductive pattern 440, and/or a third conductive pattern 450. The substrate 410 may include at least one via 415 formed therethrough. The substrate 410 may include a single layer or multiple layers.

According to an embodiment, the first conductive pattern 430, the second conductive pattern 440, and/or the third conductive pattern 450 may be formed on a first surface (e.g., the upper surface) of the substrate 410. The first conductive pattern 430, the second conductive pattern 440, and/or the third conductive pattern 450 may be configured to tune the frequency of an antenna (e.g., the antenna 305 of FIG. 3). The substrate 410, by using the first conductive pattern 430, the second conductive pattern 440, and/or a third conductive pattern 450 which are formed on the first surface (e.g., the upper surface), may be configured to secure a tuning area of the antenna 305 illustrated in FIG. 3. The first conductive pattern 430, the second conductive pattern 440, and/or the third conductive pattern 450 each may include a plating or metal contact. The first conductive pattern 430, the second conductive pattern 440, and/or the third conductive pattern 450 may be formed using a surface mount device (SMD).

According to various embodiments, the first conductive pattern 430 may include a first coupling hole 431. The first coupling means 401 illustrated in FIG. 4 may be coupled to the first coupling hole 431. The second conductive pattern 440 may include a second coupling hole 441. The second coupling means 402 illustrated in FIG. 4 may be coupled to the second coupling hole 441. The third conductive pattern 450 may include a third coupling hole 451. The third coupling means 403 illustrated in FIG. 4 may be coupled to the third coupling hole 451.

According to various embodiments, the first conductive pattern 430 and the second conductive pattern 440 may be spaced apart from each other. A capacitance pattern 435 may be formed on an area in which the first conductive pattern 430 and the second conductive pattern 440 are spaced apart from each other. The capacitance pattern 435 may be configured to tune the frequency band of the antenna 305 according to the control of the processor 120 and/or the wireless communication module 192 illustrated in FIG. 1. For example, the capacitance pattern 435 may include a capacitance area for electrically connecting between the first feeding unit 421 and the second feeding unit 422.

According to various embodiments, a matching element 445 may be disposed between the second conductive pattern 440 and the third conductive pattern 450. The matching element 445 may include a lumped element. The matching element 445 may include passive elements having different element values. The passive elements may include multiple capacitors having various capacitance values and/or multiple inductors having various inductance values. The matching element 445 may include at least one switch. The at least one switch may include a micro-electro mechanical systems (MEMS) switch. The MEMS switch may be configured to perform a mechanical switching operation by a metal plate therein, and thus may have a complete turn on/off properties not to substantially affect a change in irradiation properties of the antenna 305. In some embodiments, at least one of the switch may include a switch including a single pole single throw (SPST) switch, a single pole double throw (SPDT) switch, or at least three throw switch.

According to an embodiment, a first conductive pad 461, a second conductive pad 462, and/or a third conductive pad 463 may be arranged on a second surface (e.g., the lower surface) of the substrate 410. The first conductive pad 461, the second conductive pad 462, and/or the third conductive pad 463 each may have a predetermined strength or thickness. The first conductive pad 461, the second conductive pad 462, and/or the third conductive pad 463 may be made of a conductive material (e.g., metal). The first conductive pad 461, the second conductive pad 462, and/or the third conductive pad 463 may be formed using a surface mount device (SMD).

According to an embodiment, the first conductive pattern 430 and the first conductive pad 461 may be electrically connected to each other by using the first coupling means 401 coupled to the first coupling hole 431. The second conductive pattern 440 and the second conductive pad 462 may be electrically connected to each other by using the second coupling means 402 coupled to the second coupling hole 441. The third conductive pattern 450 and the third conductive pad 463 may be electrically connected to each other by using the third coupling means 403 coupled to the third coupling hole 451.

According to various embodiments, the first conductive pattern 430 and the first conductive pad 461 may be electrically connected to each other by using at least one of the via 415. The second conductive pattern 440 and the second conductive pad 462 may be electrically connected to each other by using at least one of the via 415. The third conductive pattern 450 and the third conductive pad 463 may be electrically connected to each other by using at least one of the via 415.

Referring to FIG. 5C, at least one of the feeding unit (e.g., the first feeding unit 421, the second feeding unit 422, and/or the third feeding unit 423) according to various embodiments of the disclosure may be disposed on an FPCB 510 (or an FRC).

According to an embodiment, the first feeding unit 421 may be disposed on a portion 421*a* of a position corresponding to the first coupling hole 431 formed on the first conductive pattern 430. The first feeding unit 421 may be disposed on a portion 421*a* of a position corresponding to the first conductive pad 461.

According to an embodiment, the second feeding unit 422 may be disposed on a portion 422*a* of a position corresponding to the second coupling hole 441 formed on the second conductive pattern 440. The second feeding unit 422 may be disposed on a portion 422*a* of a position corresponding to the second conductive pad 462.

According to an embodiment, the third feeding unit 423 may be disposed on a portion 423*a* of a position corresponding to the third coupling hole 451 formed on the third conductive pattern 450. The third feeding unit 423 may be disposed on a portion 423*a* of a position corresponding to the third conductive pad 463.

According to an embodiment, the first feeding unit 421, the second feeding unit 422, and/or the third feeding unit 423 may include through-holes 420 formed through the portions (e.g., 421*a*, 422*a*, and 423*a*), respectively. The first coupling means 401, the second coupling means 402, and/or the third coupling means 403 may be coupled to the through-holes, respectively.

Referring to FIG. 6, the substrate 410 may be disposed above the FPCB 510. The first coupling means 401 may be configured to electrically connect the first conductive pattern 430, the first conductive pad 461, and the first feeding unit 421. The second coupling means 402 may be configured to electrically connect the second conductive pattern 440, the second conductive pad 462, and the second feeding unit 422. The third coupling means 403 may be configured to electrically connect the third conductive pattern 450, the third conductive pad 463, and the third feeding unit 423.

Figure 7:
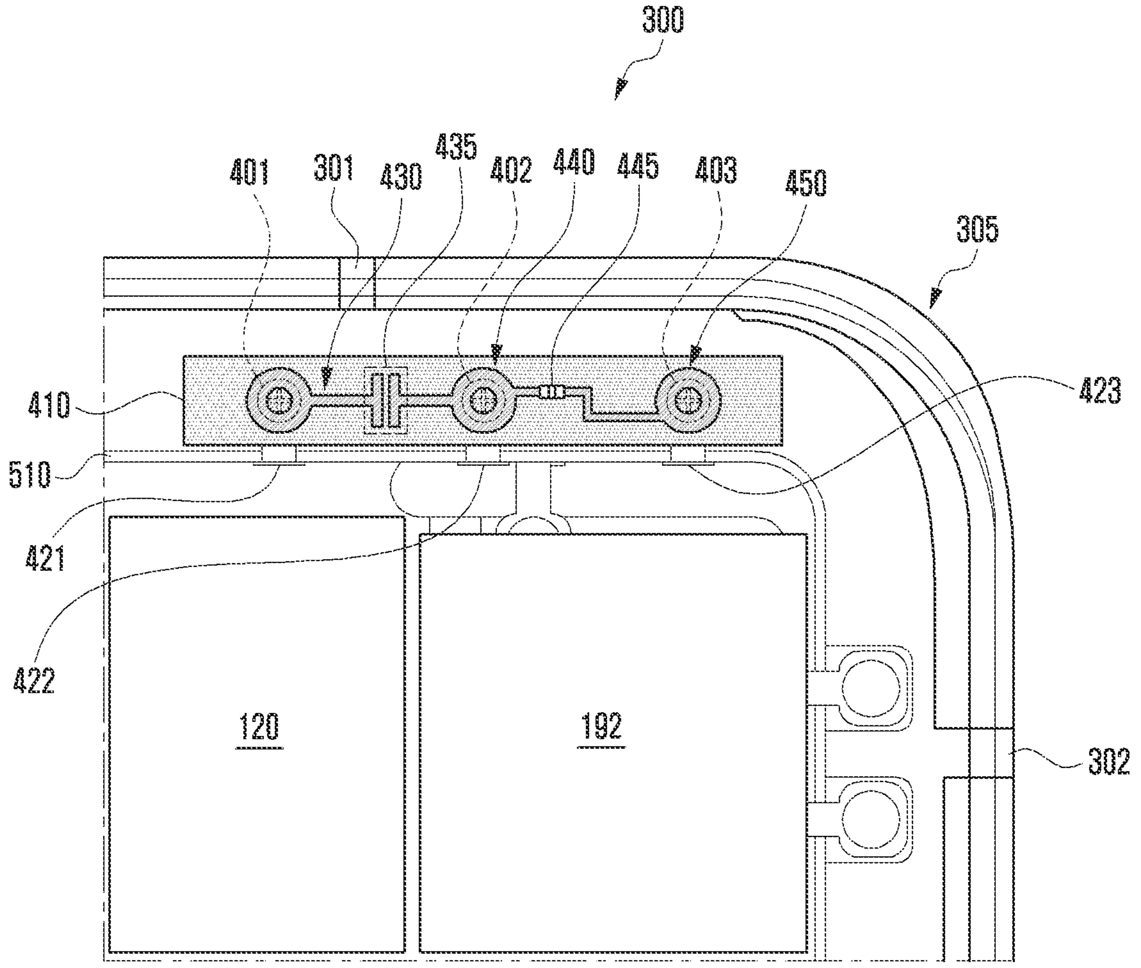
FIG. 7 is a view illustrating a layout structure of a substrate and an FPCB which are arranged adjacent to an antenna of an electronic device according to an embodiment of the disclosure.

FIG. 7 is a view illustrating a layout structure of a substrate and an FPCB which are arranged adjacent to an antenna of an electronic device according to an embodiment of the disclosure.

Referring to FIG. 7, an electronic device 300 (e.g., the electronic device 101 of FIG. 1 and/or the electronic device 200 of FIG. 2A and FIG. 2B) according to various embodiments of the disclosure may have the FPCB 510 and the substrate 410 which are disposed adjacent to the antenna 305.

According to an embodiment, the FPCB 510 may include at least one feeding unit (e.g., the first feeding unit 421, the second feeding unit 422, and/or the third feeding unit 423).

According to an embodiment, the first conductive pattern 430 may be electrically connected to the first feeding unit 421 disposed on a second surface (e.g., the lower surface) of the substrate 410 by using the first coupling means 401. The second conductive pattern 440 may be electrically connected to the second feeding unit 422 disposed on the second surface (e.g., the lower surface) of the substrate 410 by using the second coupling means 402. The third conductive pattern 450 may be electrically connected to the third feeding unit 423 disposed on the second surface (e.g., the lower surface) of the substrate 410 by using the third coupling means 403.

According to various embodiments, the first feeding unit 421, the second feeding unit 422, and/or the third feeding unit 423 may be electrically connected to the antenna 305. The first feeding unit 421, the second feeding unit 422, and/or the third feeding unit 423 may be electrically connected to the wireless communication module 192 and/or the processor 120. For example, the antenna 305 may be configured to transmit and/or receive a wireless signal of a resonant frequency band according to the control of the wireless communication module 192 and/or the processor 120.

An electronic device 101, 200, or 300 according to various embodiments of the disclosure may include an antenna 305, a wireless communication module 192 electrically connected to the antenna 305, a flexible printed circuit board (FPCB) 510 including a first feeding unit 421 and a second feeding unit 422 which are electrically connected to the wireless communication module 192, a substrate 410 disposed above the first feeding unit 421 and the second feeding unit 422, a first conductive pattern 430 including a first coupling hole 431 and a second conductive pattern 440 including a second coupling hole 441, which are formed on the upper surface of the substrate 410, a first coupling means 401 configured to penetrate the first coupling hole 431 and the first feeding unit 421 and electrically connect the first conductive pattern 430 and the first feeding unit 421, and a second coupling means 402 configured to penetrate the second coupling hole 441 and the second feeding unit 422 and electrically connect the second conductive pattern 440 and the second feeding unit 422.

According to various embodiments, the electronic device may include a capacitance pattern 435 formed between the first conductive pattern 430 and the second conductive pattern 440.

According to various embodiments, the electronic device may further include a third conductive pattern 450 which is formed on the upper surface of the substrate 410 and includes a third coupling hole 451, a third feeding unit 423 formed on the FPCB 510, and a third coupling means 403 configured to penetrate the third coupling hole 451 and the third feeding unit 423 and electrically connect the third conductive pattern 450 and the third feeding unit 423.

According to various embodiments, the electronic device may further include a matching element 445 connected between the second conductive pattern 440 and the third conductive pattern 450.

According to various embodiments, the matching element may include multiple capacitors having various capacitance values or multiple inductors having various inductance values.

According to various embodiments, the electronic device may further include a first conductive pad 461 disposed between the substrate 410 and the first feeding unit 421, and a second conductive pad 462 disposed between the substrate 410 and the second feeding unit 422.

According to various embodiments, the electronic device may further include a third conductive pad 463 disposed between the substrate 410 and the third feeding unit 423.

According to various embodiments, the substrate 410 may include at least one via 415 configured to electrically connect the first conductive pattern 430 and the first feeding unit 421.

According to various embodiments, the substrate 410 may include at least one via 415 configured to electrically connect the first conductive pattern 430 and the first conductive pad 461.

According to various embodiments, the first feeding unit 421 may include a through-hole 420 which is formed through a portion 421*a* thereof and to which the first coupling means 401 is coupled, and the second feeding unit 422 may include a through-hole 420 which is formed through a portion 422*a* thereof and to which the second coupling means 402 is coupled.

An electronic device 101, 200, or 300 according to various embodiments of the disclosure may include an antenna 305, a wireless communication module 192 electrically connected to the antenna 305, a flexible printed circuit board (FPCB) 510 including a first feeding unit 421, a second feeding unit 422, and a third feeding unit 423 which are electrically connected to the wireless communication module 192, a substrate 410 disposed above the first feeding unit 421, the second feeding unit 422, and/or the third feeding unit 423, a first conductive pattern 430 including a first coupling hole 431, a second conductive pattern 440 including a second coupling hole 441, and/or a third conductive pattern 450 including a third coupling hole 451, which are formed on the upper surface of the substrate 410, a first coupling means 401 configured to penetrate the first coupling hole 431 and the first feeding unit 421 and electrically connect the first conductive pattern 430 and the first feeding unit 421, a second coupling means 402 configured to penetrate the second coupling hole 441 and the second feeding unit 422 and electrically connect the second conductive pattern 440 and the second feeding unit 422, and a third coupling means 403 configured to penetrate the third coupling hole 451 and the third feeding unit 423 and electrically connect the third conductive pattern 450 and the third feeding unit 423.

According to various embodiments, the electronic device may include a capacitance pattern 435 formed between the first conductive pattern 430 and the second conductive pattern 440.

According to various embodiments, the electronic device may further include a matching element 445 connected between the second conductive pattern 440 and the third conductive pattern 450.

According to various embodiments, the electronic device may further include a first conductive pad 461 disposed between the substrate 410 and the first feeding unit 421, a second conductive pad 462 disposed between the substrate 410 and the second feeding unit 422, and a third conductive pad 463 disposed between the substrate 410 and the third feeding unit 423.

According to various embodiments, the substrate 410 may include at least one via 415 configured to electrically connect the first conductive pattern 430 and the first feeding unit 421.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

an antenna;

a wireless communication module electrically connected to the antenna;

a flexible printed circuit board (FPCB) comprising a first feeding element and a second feeding element which are electrically connected to the wireless communication module;

a substrate disposed above the first feeding element and the second feeding element;

a first conductive pattern comprising a first coupling hole and a second conductive pattern comprising a second coupling hole, which are formed on an upper surface of the substrate;

a capacitance pattern formed between the first conductive pattern and the second conductive pattern;

a first coupling fastener configured to penetrate the first coupling hole and the first feeding element and electrically connect the first conductive pattern and the first feeding element; and a second coupling fastener configured to penetrate the second coupling hole and the second feeding element and electrically connect the second conductive pattern and the second feeding element.

2. The electronic device of claim 1, further comprising:

a third conductive pattern which is formed on the upper surface of the substrate and comprises a third coupling hole;

a third feeding element formed on the FPCB; and a third coupling fastener configured to penetrate the third coupling hole and the third feeding element and electrically connect the third conductive pattern and the third feeding element.

3. The electronic device of claim 2, further comprising:

a matching element connected between the second conductive pattern and the third conductive pattern.

4. The electronic device of claim 3, wherein the matching element comprises multiple capacitors having various capacitance values or multiple inductors having various inductance values.

5. The electronic device of claim 2, further comprising:

a third conductive pad disposed between the substrate and the third feeding element.

6. The electronic device of claim 1, further comprising:

a first conductive pad disposed between the substrate and the first feeding element; and a second conductive pad disposed between the substrate and the second feeding element.

7. The electronic device of claim 6, wherein the substrate comprises at least one via configured to electrically connect the first conductive pattern and the first conductive pad.

8. The electronic device of claim 1, wherein the substrate comprises at least one via configured to electrically connect the first conductive pattern and the first feeding element.

9. The electronic device of claim 1, wherein the first feeding element comprises a through-hole which is formed through a portion thereof and to which the first coupling fastener is coupled, and wherein the second feeding element comprises a through-hole which is formed through a portion thereof and to which the second coupling fastener is coupled.

10. An electronic device comprising:

an antenna;

a wireless communication module electrically connected to the antenna;

a flexible printed circuit board (FPCB) comprising a first feeding element, a second feeding element, and a third feeding element which are electrically connected to the wireless communication module;

a substrate disposed above the first feeding element, the second feeding element, and/or the third feeding element;

a first conductive pattern comprising a first coupling hole, a second conductive pattern comprising a second coupling hole, and a third conductive pattern comprising a third coupling hole, which are formed on an upper surface of the substrate;

a capacitance pattern formed between the first conductive pattern and the second conductive pattern;

a first coupling fastener configured to penetrate the first coupling hole and the first feeding element and electrically connect the first conductive pattern and the first feeding element;

a second coupling fastener configured to penetrate the second coupling hole and the second feeding element and electrically connect the second conductive pattern and the second feeding element; and a third coupling fastener configured to penetrate the third coupling hole and the third feeding element and electrically connect the third conductive pattern and the third feeding element.

11. The electronic device of claim 10, further comprising:

a matching element connected between the second conductive pattern and the third conductive pattern.

12. The electronic device of claim 11, wherein the matching element comprises multiple capacitors having various capacitance values or multiple inductors having various inductance values.

13. The electronic device of claim 12, wherein the matching element further comprises at least one switch for controlling radiation properties of the antenna.

14. The electronic device of claim 10, further comprising:

a first conductive pad disposed between the substrate and the first feeding element;

a second conductive pad disposed between the substrate and the second feeding element; and a third conductive pad disposed between the substrate and the third feeding element.

15. The electronic device of claim 10, wherein the substrate comprises at least one via configured to electrically connect the first conductive pattern and the first feeding element.

16. The electronic device of claim 10, wherein the capacitance pattern includes a capacitance area in which the first conductive pattern and the second conductive pattern are spaced apart from each other.

17. The electronic device of claim 16, wherein the capacitance area electrically connects the first feeding element to the second feeding element.

18. The electronic device of claim 10, wherein the wireless communication module is configured to tune a frequency band of the antenna based on the capacitance pattern.

* * * * *